G. B. Hamlin,

Belt Gearing.

No. 108,259. Patented Oct. 11, 1870.

Witnesses.
Phil. A. Garner
Frank A. Jackson

Inventor.
George B. Hamlin.
By Wm. C. Wood
Attorney.

United States Patent Office.

GEORGE B. HAMLIN, OF WILLIMANTIC, CONNECTICUT.

Letters Patent No. 108,259, dated October 11, 1870.

IMPROVEMENT IN BELT-GEARINGS.

The Schedule referred to in these Letters Patent and making part of the same

*To all whom it may concern:*

Be it known that I, GEORGE B. HAMLIN, of Willimantic, county of Windham, in the State of Connecticut, have invented a certain new and useful Improvement in Belt-Gearing.

My invention consists in operatively combining a driving, auxiliary, and driven pulley by means of a belt-connection, so arranged as to embrace the periphery of the driven pulley upon opposite sides, thereby operating the same with but little, if any, box-friction; and, also, in a novel means for compensating for the stretching of the belting; and I do hereby declare that the following specification, taken in connection with the drawing furnished, and forming a part of the same, is a true, clear and exact description thereof.

In the drawing—

Figure 1:
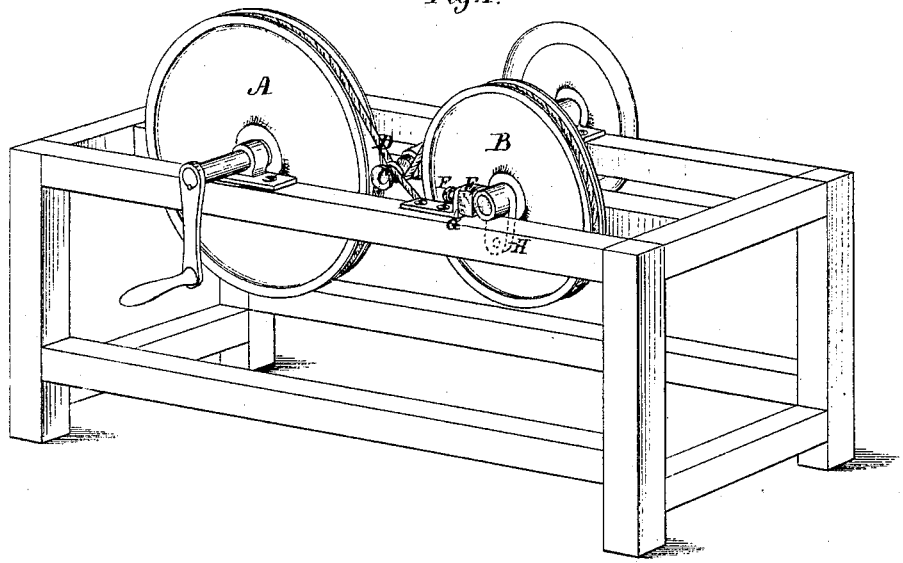
Figure 1 represents my improvement in perspective.
Figure 2:
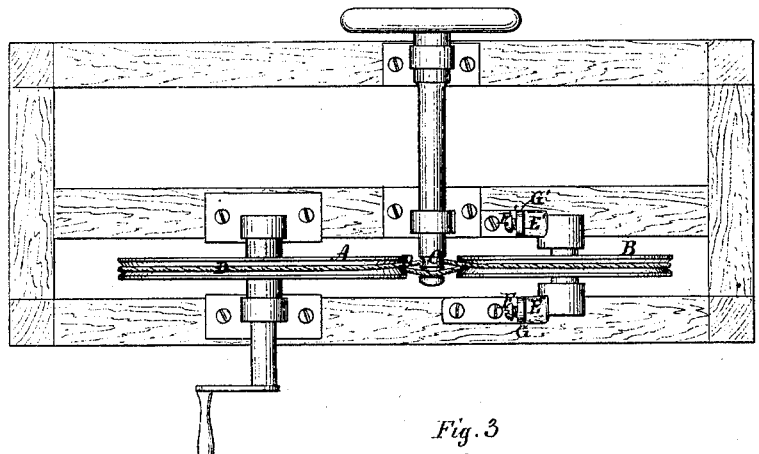
Figure 2 represents the same in top view.
Figure 3:
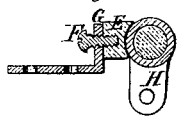
Figure 3 represents in detail the belt-tightening mechanism.

A is the driving-pulley.

B is the auxiliary pulley.

C is the driven pulley, which should be secured to the shaft of the mechanism to be operated.

D is the belt. It passes under the driving-pulley, over the driven, under the auxiliary pulley, and around it, under the driven pulley, thence to the upper portion of the driving-pulley, where its ends are united.

The auxiliary pulley B is mounted in boxes sustained by two arms, H, which are pivoted at their lower ends.

E and E' are elastic cushions, arranged in each case to engage with that side of the pulley-box next to the driven pulley.

F and F' are set-screws passing through shoulders G, and arranged to engage with the elastic cushions E, and by means of which the cushions may be made to bear with more or less force against the swinging boxes of the auxiliary pulley, and thus compensate for any ordinary stretching of the belt, and maintain a regular and even frictional contact with the surface of the pulleys with which it engages.

By my improved mode of gearing, it becomes practicable to dispense with boxes at a point on the driven shaft near the pulley C, and, therefore, a vibratory or other movement may be given to the opposite end of the shaft, if desired, without seriously affecting in any manner its practical operation.

In the drawing a round belt is shown. A flat belt may as well be used, with straight-faced pulleys, in which case a projecting collar, as shown, would be requisite midway of the face of the pulley C, in order to prevent the inner edges of the belt from chafing, &c.

With my improvement in belt-gearing a degree of power is communicated to the driven pulley practically equal to double that resulting from the use of a belt of the same capacity applied in the ordinary manner.

Having thus described my invention,

I claim as new and desire to secure by Letters Patent—

1. The improved belt-gearing herein described, consisting of the driving-pulley A, auxiliary pulley B, and driven pulley C, combined and operated by the belt-connection D, arranged to embrace the driven pulley at opposite peripheries, for the purposes specified.

2. The pivoted bearings H, in combination with elastic cushions arranged to bear with pressure in opposition to the tractile force, substantially as described, for the purpose specified.

GEORGE B. HAMLIN.

Witnesses:
PHIL. F. LARNER,
FRANK A. JACKSON.